United States Patent [19]

Ohumi

[11] 4,294,286
[45] Oct. 13, 1981

[54] ELECTROMAGNETICALLY OPERABLE FLUID FLOW CONTROL VALVE MECHANISM

[75] Inventor: Takeharu Ohumi, Toyota, Japan

[73] Assignees: Aisin Seiki Kabushiki Kaisha, Kariya; Toyota Jidosha Kogyo Kabushiki Kaisha, Toyota, both of Japan

[21] Appl. No.: 39,592

[22] Filed: May 16, 1979

[30] Foreign Application Priority Data

May 16, 1978 [JP] Japan ................................. 53-58108

[51] Int. Cl.³ ...................... F16K 11/07; F16K 31/08
[52] U.S. Cl. ................................ 137/625.48; 251/129; 251/65
[58] Field of Search ................. 137/625.48, 625.65; 251/65

[56] References Cited

U.S. PATENT DOCUMENTS

| | | | | |
|---|---|---|---|---|
| 2,637,343 | 5/1953 | Matthews | ...................... | 251/65 X |
| 3,099,280 | 7/1963 | Holzbock | .................. | 137/625.65 X |
| 3,840,045 | 10/1974 | Grosseau | ..................... | 137/625.65 X |
| 4,040,445 | 8/1977 | McCormick | ............... | 137/625.65 X |
| 4,071,042 | 1/1978 | Lombard et al. | ............... | 251/129 X |

FOREIGN PATENT DOCUMENTS 2730144 2/1978 Fed. Rep. of Germany ........................ 137/625.64

*Primary Examiner*—Arnold Rosenthal
*Attorney, Agent, or Firm*—Oblon, Fisher, Spivak, McClelland & Maier

[57] ABSTRACT

An electromagnetically operable control valve mechanism of linear motor type adapted for vehicle emission control devices, comprising a single common inlet port, two outlet ports, an electric linear motor and a valve member operatively connected to the motor and commonly disposed on two paths connecting the outlet ports with the inlet port. The control valve mechanism alternately communicates the outlet ports with the inlet port in response to and in proportion to an electric current supplied to the motor.

4 Claims, 2 Drawing Figures

ELECTROMAGNETICALLY OPERABLE FLUID FLOW CONTROL VALVE MECHANISM

BACKGROUND OF THE INVENTION

This invention relates to a fluid control valve mechanism and particularly to an electromagnetically operable control valve mechanism of linear motor type adapted for use on motor vehicles to alternately supply fluid from a single supply source to two fluid operated actuators.

Several types of control valve mechanisms have been developed. These control valve mechanisms have been generally successful and highly efficient in operation, but they usually are of such nature as to control fluid communication between a fluid supply source and one fluid operated actuator. There are needed two control valve mechanisms of this type in order to alternately supply fluid from a single supply source to two fluid operated different actuators, such as is desired in vehicle exhaust gas recirculation or other emission control devices. This makes the apparatus complicated in construction and the cost of manufacturing and assembling the apparatus rather prohibitive.

SUMMARY OF THE INVENTION

A principal object of the present invention is therefore to provide a control valve mechanism of linear motor type having one fluid inlet port and two outlet ports to be alternately in fluid communication with the inlet port in response to an electric signal, wherein the mechanism is highly simplified from the standpoints of manufacture and assembly, thus materially reducing the cost of the mechanism.

Therefore, there are comprised in the embodiment of the invention, a casing having one inlet port and two outlet ports, valve means disposed intermediately of the inlet port and the outlet port and an electromagnetically operable means operatively connected to the valve means to alternately connect the outlet ports with the inlet port.

DESCRIPTION OF THE PREFERRED EMBODIMENT

Figure 1:
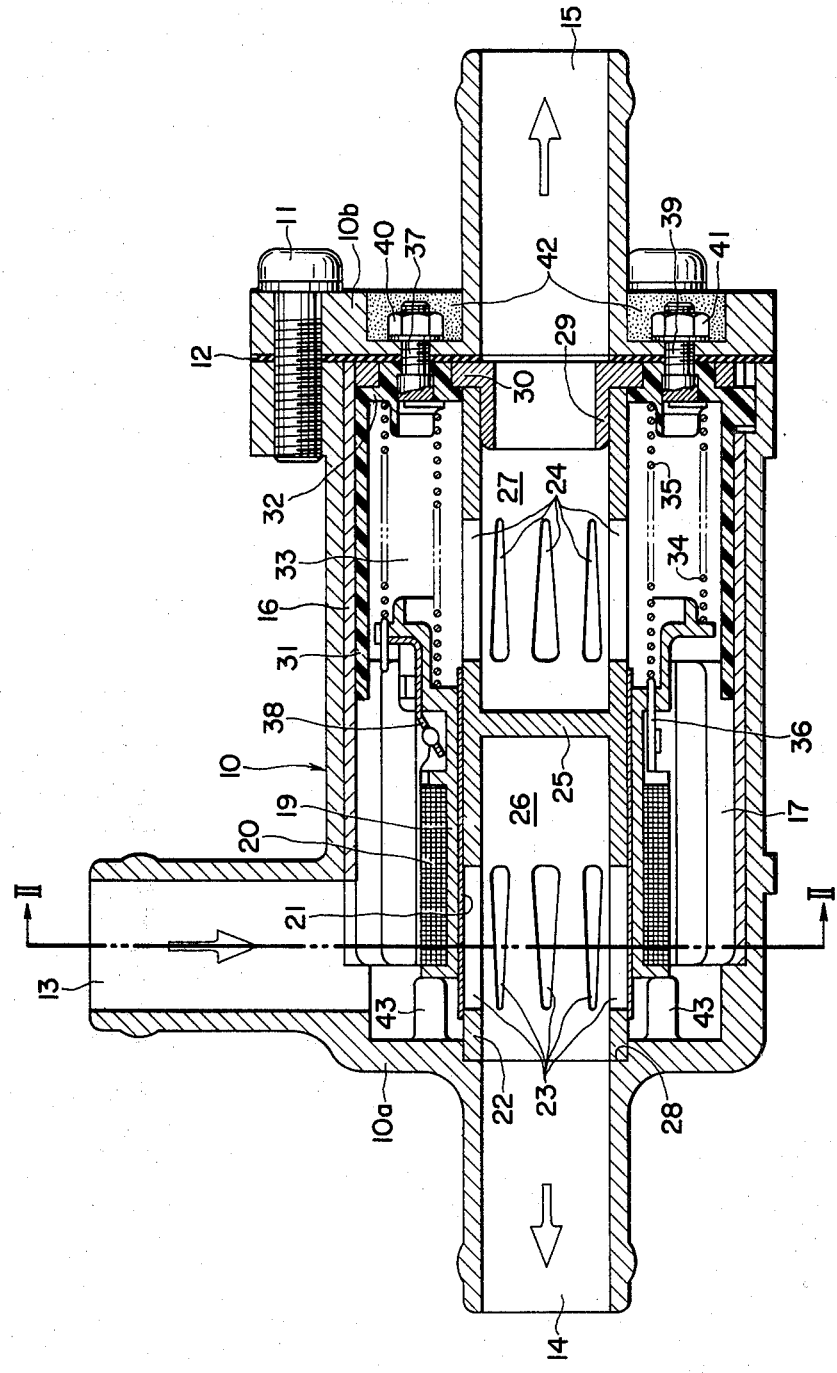
FIG. 1 is an axial cross sectional view of the control mechanism according to the invention.
Figure 2:
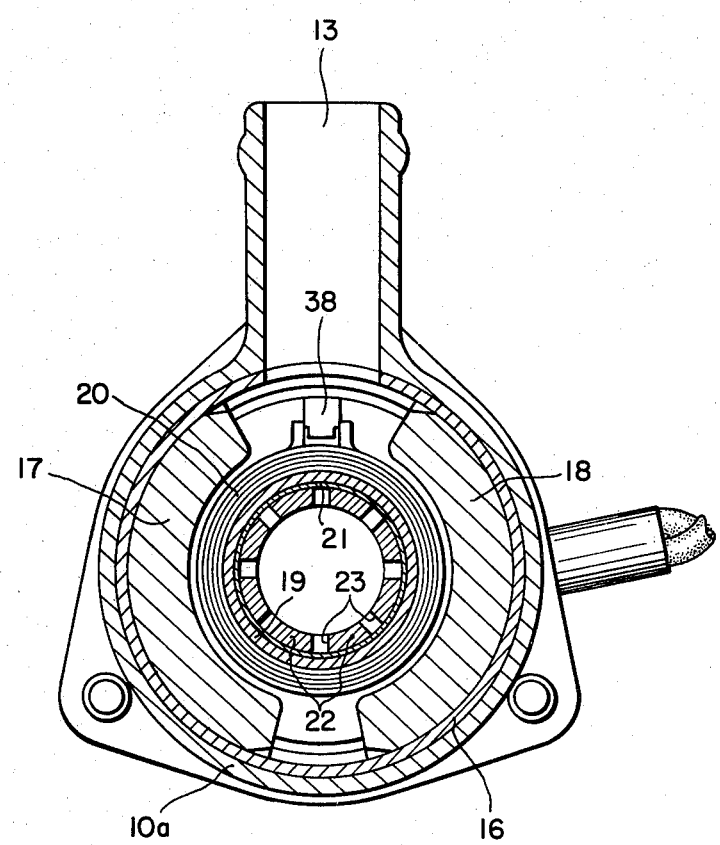
FIG. 2 is a cross sectional view taken along the line II—II in FIG. 1.

In this invention, a control valve mechanism includes a casing 10 comprised of the casing part 10a and the casing part 10b secured together by means of bolts 11 one of which is shown in the view. A gasket or sealing member 12 is clamped between the casing parts 10a and 10b and forms a seal therewith. The casing part 10a has an inlet port 13 and an outlet port 14. The other casing part 10b has an outlet port 15. Within the casing 10 is a tubular member or yoke 16 of magnetic material, such as iron. Further, within the yoke 16 are disposed a pair of arcuate permanent magnets 17 and 18 as best shown in FIG. 2 in cross section. Still further, within the magnets 17 and 18 is disposed a tubular bobbin 19 of magnetic material surrounded with an electric coil 20. The bobbin 19 has a liner or valve member 21 on the internal face in firmly fit relation therewith so that they can move as a unit as described in detail hereinbelow. The valve member 21 has a sliding running fit on a tube 22 to form in cooperation therewith a sliding valve construction as hereinbelow described in greater detail.

The tube 22 has a suitable number of circumferentially spaced windows 23 in the wall of the tube. The windows are of elongated hole shape in a manner such that the cross section is continuously reduced as the cross section shifts to the left in the view. The contemplation of the shape of the windows 23 will be explained as the description proceeds. The tube 22 has another suitable number of similar windows 24. Each of the windows 24 has its cross section reduced reversely to that of the windows 23 as will be seen in the view. Intermediately of both groups of the windows 23 and 24, a separating wall 25 is disposed in the tube 22 to define chambers 26 and 27. The chamber 26 is in communication with the first outlet port 14 while the other chamber 27 is in communication with the second outlet port 15. The tube 22 has its left end suited to an annular shoulder 28 in the end wall of the casing part 10a and the opposite end to an annular retainer member 29 in the external face of which is a flange 30 to be clamped between the seal 12 and the end of the tube 22. The flange 30 suits an annular end wall 32 of a spring retainer 31. The spring retainer 31 closely fits on the yoke 16 and is of about half length of the tube 22. The spring retainer 31 cooperates with the tube 22 to define therebetween an annular space 33 to contain therein a pair of coiled compressed springs 34 and 35. The inside diametrically smaller spring 35 has its left end electrically connected through a terminal metal 36 to one end of the coil 20 and has another opposite end to a terminal member 37. The outer spring 34 has the left end connected through another metal 38 to another end of the coil 20 and the opposite end to a terminal member 39. The terminal members 37 and 39 are fastened to the cover or casing part 10b in electrically insulated relation therewith by means of nuts 40 and 41, respectively.

Both coiled springs 34 and 35 normally urge the bobbin 19 to stopper members 43 in the left end wall of the casing part 10a. The springs 34 and 35 additionally serve as electric conductive members to electrically communicate the coil 20 to the terminal members 37 and 39. The terminal members 37 and 39 are connected to any electric supply source (not shown). The spring retainer 31 is preferably formed of electrically non-conductive material, such as a plastic material, in order to provide insulating means for the springs 34 and 35. The nuts 40 and 45 are embedded in electrically non-conductive silicon rubber material 42 within corresponding cavities in the external face of the casing part 10b.

Operation

Since the yoke 16, bobbin 19 and innermost tube 22 are all of magnetic material, such as iron, they cooperate to form a magnetic flux circuit or field of the permanent magnets 17 and 18. It will be seen that the coil 20 with the bobbin 19 is disposed transversely of the magnetic flux produced by the magnets 17 and 18.

In case of no electric current through the coil, the bobbin 19 and hence the valve member 21 are held in the position shown and the chamber 26 and hence the outlet port 14 are isolated from the inlet port 13. The other chamber 27 and hence the second outlet port 15 are communicated through the windows 24, annular space 33 and clearance defined between the magnets 17 and 18 and another clearance between the magnets and the bobbin 19, to the inlet port 13. If the electric current is supplied through the terminal members 37 and 39, the coil 20 with the bobbin 19 serves as an armature of a linear motor to be shifted to the right in the view against the spring bias of the springs 34 and 35. The valve member 21 also moves to the right together with the bobbin 19 so that the outlet 14 is communicated with the inlet port 13 while the other outlet port 15 is isolated from the inlet port 13. This is, however, the case that the coil 20 and hence the valve 21 shift to the right in full length of the given stroke. Since the electromagnetic force derived by the linear motor is proportional to an electric current supplied to the coil and directionally reverse to the spring bias of the springs 34 and 35, the armature or bobbin 19 may shift to the right a shorter distance than the stroke. In such situation, the windows 23 and 24 are partially opened and closed, respectively. Both outlet ports 14 and 15 are therefore partially or at a less rate communicated with the inlet 13. This operation mode is often useful in actuating two different fluid operated actuators such as those in the known emission control device. The elongated and continuously varying section shape of the windows 23 and 24 provides means to assist the operation.

It will be understood from what has been thus far described that the valve mechanism according to the invention is effective to control fluid flow from one inlet port to two outlet ports in response to and in proportion to an electric current supplied, and wherein the mechanism is highly simplified from the standpoints of manufacture and assembly of the vehicle exhaust gas recirculation system or other vehicle emission control device, thus reducing the cost of them.

What is claimed is:

1. A control valve mechanism comprising a casing having therewithin a valve means, said valve means comprising a linearly movable valve member, an electric motor means comprising a field and an armature to move linearly and operatively connected to the valve member, the electric motor means having a coil of electrically insulated wire surrounding the armature, and the field comprising a pair of arcuate permanent magnets disposed to form a circle surrounding the armature with a magnetic field across the coil, one inlet port, a first outlet port, a second outlet port, a first fluid path connecting the inlet port and the first outlet port, a second fluid path connecting the inlet port and the second outlet port, said valve means being commonly located on both of said fluid paths to control fluid communication therethrough, and spring means normally urging the valve member to a position in which the first fluid path is closed while the second fluid path is opened, the spring means comprising a pair of diametrically different coiled springs in concentric and electrically insulated relation with each other, said springs being respectively connected to both ends of said coil of wire of the armature to provide electric conductive means, wherein said valve means further comprises a tubular guide member, the valve member having a sliding fit on the tubular guide member, and the armature of the electric motor means being of tubular form and firmly surrounding the valve member to move together as a unit.

2. A control valve mechanism according to claim 1, wherein the springs respectively have terminal members at the other ends opposite to those connected to the coil of the armature, said terminal members being fastened to the wall of the casing to provide means for connecting the springs to an electric supply source.

3. A control valve mechanism comprising;
  a casing having an inlet port, and first and second outlet ports;
  first and second fluid flow paths between the inlet port and the first and second outlet ports, respectively;
  a tubular guide member positioned within said casing and defining at least a part of said fluid flow paths;
  at least one first flow passage in a wall portion of said tubular member for fluid passage therethrough from the inlet port to the first outlet port;
  at least one second flow passage in another wall portion of said tubular member for fluid passage therethrough from the inlet port to the second outlet port;
  a valve means of tubular form having a sliding fit on said tubular member and cooperating with said first and second flow passages to form first and second valve devices interposed between said inlet port and said first and second outlet ports, respectively;
  an electric motor comprised of a field and a movable coil armature arranged concentrically with said valve means and connected to said valve means to move linearly together; and
  spring means engaging said valve means, normally urging said valve means toward a first position closing the first flow passage.

4. A control valve mechanism according to claim 3, wherein the tubular guiding member has two separated groups of axially elongated windows in the wall of the tubular guiding member, and the linear stroke of the armature is so set up that the valve member can completely close one of the groups of the windows and at the same time completely open the other group of the windows with a result that one of the fluid paths is completely blocked while the other fluid path is completely opened.

* * * * *